Patented May 30, 1950

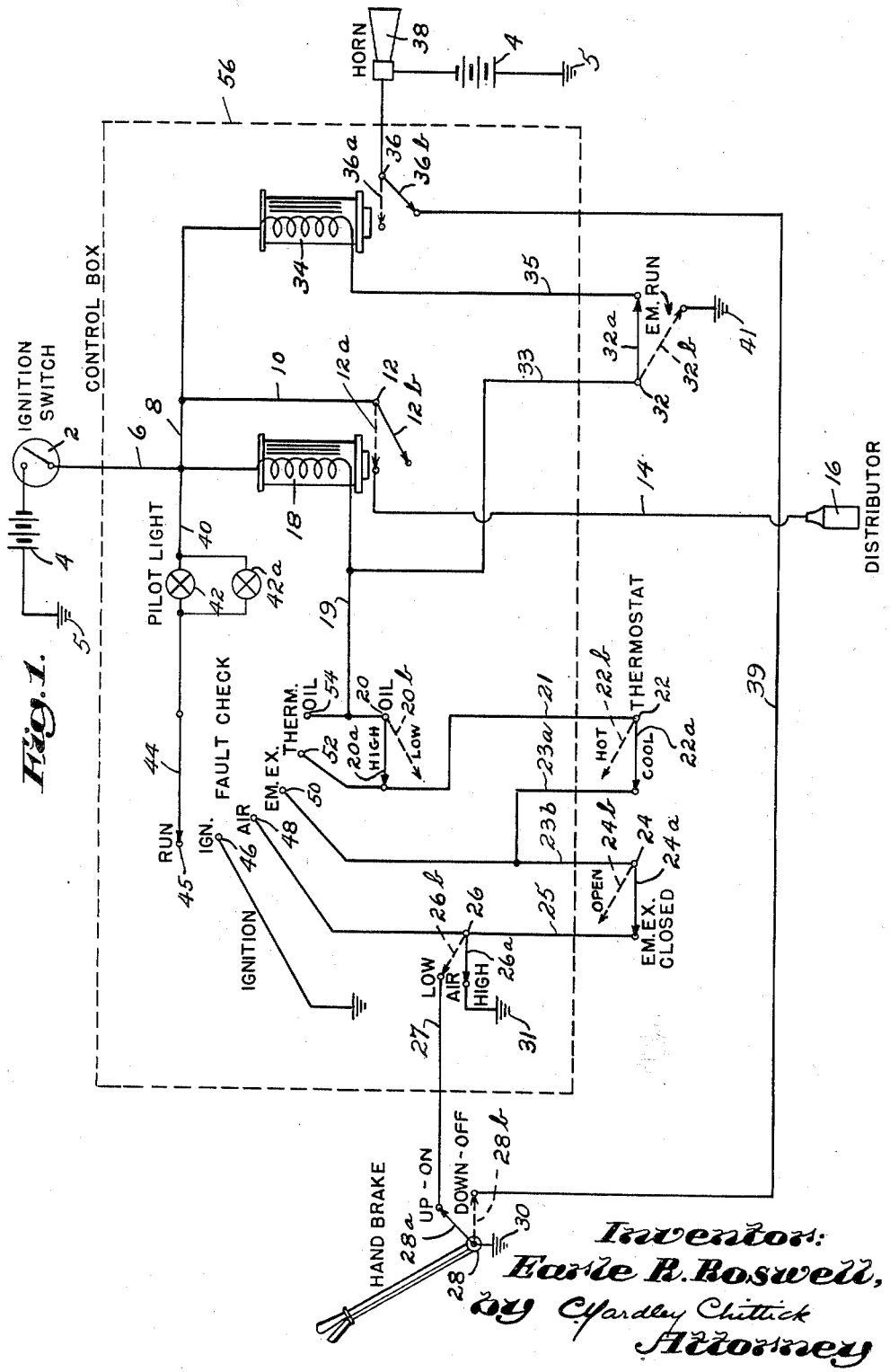

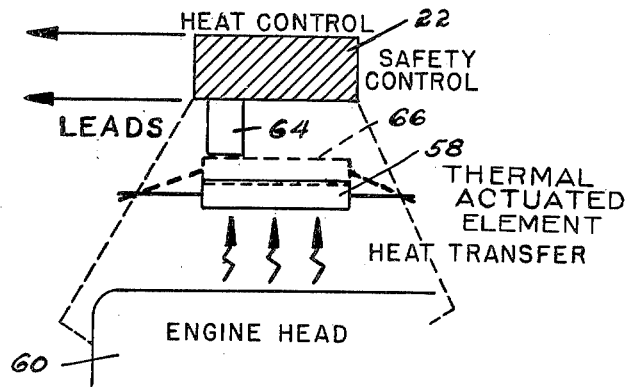
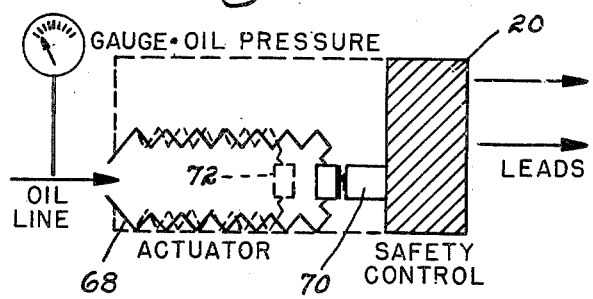
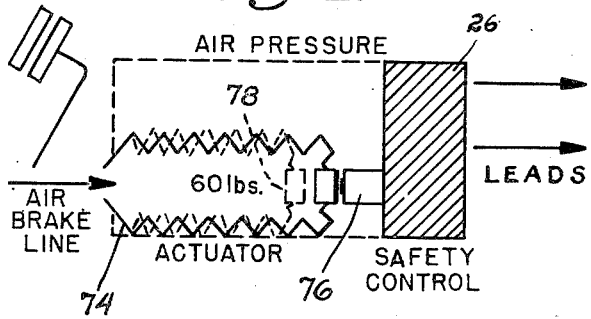

2,509,400

UNITED STATES PATENT OFFICE 2,509,400

SAFETY CONTROL CIRCUIT

Earle R. Roswell, Marshfield, Mass., assignor, by mesne assignments, to The Chase Shawmut Company, Newburyport, Mass., a corporation of Massachusetts Application October 16, 1947, Serial No. 780,116

8 Claims. (Cl. 180—82)

This invention relates to controls for automotive vehicles and is particularly concerned with controls for safeguarding the engine and vehicle.

In the ordinary operation of buses and trucks which are run for profit, it is important that operation costs be kept at a minimum. Ordinarily, the vehicle is provided with a complete set of indicators, so that the driver may be advised of the operating conditions at critical points. However, experience has shown that drivers from time to time fail to observe the development of dangerous conditions, and such failure may subsequently result in a serious and costly breakdown.

The object of this invention more specifically, then, is to provide an electrical control circuit which will automatically shut off the engine and sound an audible signal when any one or more of the following conditions is present: too low oil pressure or oil level, too high engine temperature, too low air pressure in the compressed air tank that actuates the brakes, and an open or incompletely closed and latched emergency exit, if the vehicle is so equipped.

In addition to the foregoing, the invention includes means for determining where the fault lies after the engine has been shut off by the safety control circuit. This enables either the driver or service man to bring the vehicle into operating condition again without undue loss of time.

A further object of the invention is to provide a mechanism whereby it will be impossible (except in an emergency) for the driver to put the vehicle in motion until adequate air pressure is available to operate the brakes properly.

In addition to the foregoing, the invention also includes means whereby, after the engine has been halted by the development of an undesirable condition, the operator may, for a limited or emergency period, put the vehicle in operation to move it to a safe place off the road. During the period that the vehicle is being run under emergency conditions, a clearly audible signal, preferably in the form of a horn, will be sounded continuously, so that other approaching vehicles on the road will be forewarned that some unusual situation is present. This warning will tend to minimize accidents that might otherwise occur.

The invention will be more clearly understood as the description proceeds with the aid of the accompanying drawings, in which:

Fig. 1 is a diagram of the electrical circuit that causes the cut-off of the engine, easy determination of the fault location, and sounding of the horn.

Fig. 2 is a diagrammatic view of the engine temperature control.

Fig. 3 is a diagrammatic view of the oil pressure control.

Fig. 4 is a diagrammatic view of the air pressure control.

*Safety control circuit*

Referring to Fig. 1, the ignition circuit includes the ignition switch 2, the battery 4 grounded at 5, the connecting wires 6, 8 and 10, switch 12, and wire 14 to distributor 16.

When the engine is running, switch 12 will be in closed dotted line position 12a. When any fault develops, switch 12 will be opened to position 12b and the engine will stop. In order to bring about this condition, the novel controlling circuit includes the following:

Switch 12 is actuated by relay 18. This relay is in a circuit parallel to the ignition circuit and is also connected in series by wire 19 with a control switch 20 which may be influenced either by oil pressure or oil level, and is shown closed in solid line at 20a and in open position in dotted line at 20b, by wire 21 with a thermostatically controlled switch 22 operated by the engine temperature and shown in closed position at 22a and in open position at 22b, by wires 23a and 23b with an emergency exit switch 24 shown in closed position at 24a and in open position at 24b, and by wire 25 with an air pressure switch 26 shown in high pressure position in solid line at 26a and in low pressure position in dotted line at 26b.

When the air pressure switch is in low pressure position as at 26b, then the circuit continues in series by wire 27 through the hand brake controlled switch 28 shown in closed solid line position when the hand brake is on at 28a. Switch 28 will be in dotted line position at 28b when the hand brake is off.

When the operator desires to start the engine, for example, in the morning after the vehicle has been standing, under normal conditions the hand brake will be on, the air pressure will probably be low, the emergency exit will be closed, the engine temperature will be low, and the oil pressure will be zero. Therefore, except for open switch 20b, there will be a circuit from the ignition switch 2 to the ground 30 at the hand brake through relay 18 and switches 22a, 24a, 26b, and 28a.

With the ignition switch closed, the operator then steps on the starter in the usual manner, after which two or three revolutions of the engine will result in the development of sufficient oil pressure to move the oil pressure control switch to position 20a, which thereupon closes the circuit to ground 30 and causes current to flow through relay 18, closing switch 12a, thus permitting current to flow to the distributor 16 and the spark plugs, whereupon the engine starts. If switch 20 is controlled by oil level rather than pressure, it will normally be in closed position at 20a, whether the engine is stopped or running, so long as adequate oil is present in the crank case.

Operation of the engine automatically starts the air compressor working to build up adequate air pressure in the tank so that the brakes may operate properly. As soon as this pressure arrives at a predetermined minimum, switch 26b shifts substantially instantaneously to high pressure position 26a and ground 31, which maintains the circuit through relay 18 but frees the circuit through hand brake controlled switch 28. This enables the operator to release the hand brake without cutting the relay circuit 18, after which the vehicle may then proceed in the normal manner.

Let us assume that during operation the oil pressure or oil level falls, due to failure of the pump or loss of oil. Switch 20 will then move to position 20b, breaking the circuit through relay 18, causing switch 12 to move from closed position 12a to open position 12b. This breaks the ignition circuit and the engine stops.

In a similar manner, if the engine temperature rises beyond a safe operating point, then switch 22 moves to open position 22b, which breaks the ignition circuit through relay 18 and opens switch 12 to stop the engine.

Again, should the emergency door be opened or not properly closed and latched, switch 24 will then be in open position 24b to break the circuit through relay 18 to open switch 12 to stop the engine.

Another faulty condition that could develop during running of the vehicle would be loss of air pressure in the air tank, thereby rendering the braking system ineffective, or, at best, inefficient. Whenever the air pressure drops to or below a safe minimum, switch 26 will move from high pressure position 26a to low pressure position at 26b. At this time, if the vehicle is under way, the hand brake will be in off position and switch 28, controlled by the hand brake, will be in position 28b. Therefore the relay circuit 18 will be broken at the hand brake switch, thus opening switch 12 to stop the engine.

Horn circuit

To advise the operator immediately on the breaking of the ignition circuit, a horn circuit is provided. This consists of a horn 38 connected to the down or off terminal of brake switch 28 by wire 39 and including in series switch 36.

During all the time that the foregoing normal operation is taking place, the two position emergency run switch 32 connected with relay 18 by wire 33 and with relay 34 by wire 35 has been in solid line position 32a, with the result that whenever the current flows through relay 18 it likewise flows through relay 34. This results in switch 36 being in open position 36a whenever switch 12 is in position 12a.

When switch 36 is in open position 36a, the horn circuit is broken, so that horn 38 will not sound. The result of this arrangement is that whenever the circuit through relay 18 is broken by the opening of any one of the several control switches, the circuit through relay 34 will likewise be broken and switch 36 will at once assume the closed solid line position 36b. If the hand brake is off at this time with hand brake switch 28 in position 28b, a circuit will be completed through the horn which will at once advise the driver and others that the engine circuit has been broken. In order to stop the blowing of the horn, the operator must pull on the hand brake, moving the hand brake switch to position 28a, which, of course, breaks the horn circuit.

Emergency run

Upon putting on the hand brake after breaking of the engine ignition circuit, the vehicle will come to a halt, but most likely will still be on the road. If the operator then considers it desirable to move the vehicle to a safer place off the road through emergency operation of the engine, even though this may entail some possible damage to the equipment, this may be done in the following manner. The emergency run switch 32 may be manually shifted to position 32b to ground 41, which will then energize relay 18 and bring switch 12 again to closed position 12a. This enables the motor to be started again, and upon release of the hand brake the vehicle may be driven to a safe location. It will be understood, however, that the engine operation continues only so long as the emergency run switch is in position 32b and during this period the horn will sound, as the hand brake switch will be in position 28b and switch 36 will be in position 36b, as relay 34 is not energized.

Fault check mechanism

Having brought the vehicle to a safe location, the engine is then stopped and the operator or service man starts his search for the fault that has developed. This survey is conducted in the following manner and through the use of the following circuits.

A circuit 40 in series with the ignition switch has therein a pilot light 42 and a movable switch member 44 which during normal operation of the vehicle is at an open position 45 marked "Run."

As a protection against failure, a second pilot light 42a in parallel with light 42 may be included. Switch 44 may be shifted to a succession of positions 46, 48, 50, 52, and 54, which positions are referred to as ignition, air, emergency exit, thermostat, and oil. The ignition position 46 is grounded so that upon moving switch 44 to position 46, if battery 4 is operating and ignition switch 2 functioning, current will flow through and light pilot light 42. This will show that there is no fault with the ignition circuit. (It might be pointed out here that if emergency running had been accomplished through the use of switch 32, it would indicate that there was no trouble in relay 18 or switch 12.)

Switch 44 is then turned to air position 48. If the hand brake is moved to off position, then pilot light 42 will go on only if the air pressure switch is in high position 26. If, on the other hand, the air pressure is low, with switch 26 in position 26b, there will be no circuit through the hand brake switch 28 to the ground, and hence light 42 will be out. This may be checked by drawing the hand brake to on position putting the switch in position 28a. Light 42, previously dark, should then go on.

If the fault does not appear to be either in the ignition or air pressure, then switch 44 is turned to position 50. If the fault lies in the emergency exit switch 24, then that switch will be in position 24b and the pilot light will not go on. If, however, the emergency exit switch is closed, the circuit will be completed through 24a and the high air pressure position 26a, it having been previously determined that the fault was not in the air pressure.

If the fault has still not appeared, then the switch 44 is turned to position 52. If the engine is not or has not been overheated, switch 22 will be closed at position 22a and the circuit will be completed through emergency exit switch 24a and high pressure air switch 26a to the ground, so the pilot light 42 will go on. On the other hand, if the engine is overheated or was during operation overheated, switch 22 will be in a position 22b and the light 42 will be dark.

If the failure still has not appeared, then switch 44 is finally turned to position 54. With the engine stopped, of course, there will be no oil pressure, so that the oil switch will be in position 20b and the light will be out. However, upon stepping on the starter, a few revolutions of the engine will determine whether or not the oil system is at fault. If the oil system is functioning, switch 20 will move to position 20a, and pilot light 42 will go on, as it has already been determined that switches 22, 24 and 26 are properly closed. If the oil level rather than pressure controls switch 20, the latter will be in open position 20b whenever the level is too low.

In the foregoing manner, then, the failure that caused the engine to cease operation is readily determined. Under ordinary circumstances, it is extremely unlikely that two or more faults would develop simultaneously, and therefore the repair procedure contemplates remedying the first fault that appears, which will ordinarily bring the engine back into normal operation. However, after remedying the first fault found, good practice dictates a complete check for other possible faults before restarting the engine.

*Control mechanism*

The circuit, including the wiring and switches, that has been diagrammatically disclosed in Fig. 1 is housed in a suitable box indicated at 56, so that handling and installation may be facilitated. From this box extend leads going to the operating switches and other elements.

In Figs. 2, 3 and 4 are shown means for effectuating the operation of the various switches at the several critical places. In Fig. 2 a thermal actuated element 58 is positioned where it may be affected by engine temperature.

The switch 22 during normal operation is closed as at 22a in Fig. 1. The switch is maintained in this closed position by element 58, which holds operating member 64 in closed position. When the temperature exceeds a predetermined degree, element 58 will function to release member 64 and open switch 22. The construction is such that switch 22, having once opened through operation of the member 58, cannot reset itself after the temperature falls. This could be accomplished through the use of a fusible element 58, for example. Thereafter manual resetting is required. Thus, if the fault has been in too high engine temperature, it may be located through the operation of the fault check mechanism. If the switch 22 could reset itself prior to operation of the fault check mechanism, the trouble could not be detected.

An oil pressure control switch is illustrated in Fig. 3. Here the pressure from the oil line is applied to a bellows 68, the end of which presses against actuator 70 of switch 20 to hold it in closed position 20a during normal operation. When the oil pressure falls, then bellows 68 contracts to the dotted line position 72, and switch 20 assumes open position 20b indicated in Fig. 1. Switch 20 could be arranged to be actuated by the oil level instead of the oil pressure. When the oil level is above a predetermined point, switch 20 is closed at 20a. When the level falls too low, then switch 20 opens.

An air pressure switch is shown in Fig. 4. In this arrangement the bellows 74 under proper air pressure, which, for example, may be 60 pounds per square inch, is elongated sufficiently to press against actuator 76 to maintain switch 26 in the high pressure closed position 26a shown in Fig. 1. When the pressure drops below a desired minimum, then bellows 74 contracts to the dotted line position 78, so that switch 26 then automatically assumes the second position 26b, as shown in Fig. 1.

The emergency exit switch 24 not illustrated is a precision low travel limit switch set to function on commencement of release of the latch before the door opens. When the emergency exit is closed the switch is closed, and when the door is open or not completely shut or not properly latched the switch is open. Similarly, the emergency run switch has not been illustrated in detail. It may be in the form of a manually operated two position push button type switch which, when pressed, goes to position 32b and when released returns to its original position at 32a.

Relays 18 and 34 and switches 12 and 36 controlled thereby are conventional.

While the invention has been disclosed with reference to a preferred circuit, it is to be understood that it is not to be limited thereby but only by the appended claims.

I claim:

1. In an automotive vehicle, an engine ignition circuit including a switch, means for controlling said ignition circuit switch, said means comprising a second circuit having in series a plurality of switches each influenced by a different condition material in the operation of said vehicle, one of said switches being subject to the pressure of air in a tank and having high and low positions determined by the said air pressure, said high position constituting part of said second circuit; a third circuit including all of said second circuit switches with said air pressure switch in its low position, and one manually controlled switch, whereby a circuit may be completed through said second circuit switches and said manually controlled switch, and means operable when a circuit has been completed through said second or third circuit switches to cause said ignition circuit switch to close, whereby said engine may receive ignition current.

2. In an automotive vehicle, an engine ignition circuit including a switch, means for controlling said ignition circuit switch, said means comprising a second circuit in parallel with said ignition circuit, said second circuit including in series a plurality of switches each influenced by a different condition material in the operation of said vehicle, one of said switches being subject to the pressure of air in a tank and having high and low pressure positions and adapted when the pressure in said tank is low to connect said second parallel circuit to a manually operable switch movable according to brake position whereby when said air pressure is low and said brake is on and proper operating conditions exist at the other of said second circuit switches, said second circuit will be closed, and means operable by said second circuit when closed to cause said ignition circuit switch to close, whereby said engine may receive ignition current.

3. In an automotive vehicle, an engine ignition circuit including a switch arranged to open to break said ignition circuit when improper conditions develop, a second circuit parallel to said ignition circuit including in series a plurality of switches, one of which is an air pressure operated two position switch, which will be closed when the conditions controlling said switches are proper for operation of said engine and vehicle, thereby closing said second circuit to actuate means for maintaining said ignition circuit switch closed whereby said engine may receive ignition current, a brake operated switch having two positions, one position putting it in series with said second circuit when said air pressure operated switch is in low pressure position, the other position putting it in series with a horn circuit, said horn circuit being parallel to said second circuit, and means other than said brake operated switch for breaking said horn circuit when said engine is in normal operation.

4. In an automotive vehicle, an engine ignition circuit including a switch, electrical means for closing said switch, said means in series with two parallel circuits, one of said parallel circuits having in series a plurality of switches each influenced by a different condition material in the operation of said vehicle and which when closed to complete said circuit will energize said electrical means to close said ignition circuit switch, the other of said parallel circuits including the aforesaid plurality of switches and in addition a manually operable switch, all of which switches, when closed to form said other parallel circuit, will also energize said electrical means and close said ignition circuit switch.

5. In an automotive vehicle, an engine ignition circuit including a switch, a plurality of other circuits parallel to said ignition circuit, one of said other circuits including a horn and a manually operable switch, another of said circuits including a plurality of switches each influenced by a condition material in the operation of said vehicle, and another of said circuits including an indicator and a manually operated multiple contact switch for putting said indicator in series with one or more of said plurality of switches, and means controlled by the circuit including said plurality of switches for closing said ignition circuit switch.

6. In an automotive vehicle, an engine ignition circuit including a switch, automatically operable means for closing and maintaining said switch closed under proper operating conditions whereby ignition current may be made available to said engine, said means also having in parallel an emergency run circuit which includes a two position manually operated switch which when moved to emergency position will actuate said means in the absence of proper operating conditions to close said ignition circuit switch, and another circuit parallel to said emergency run circuit, said other circuit including a horn and two switches, one a single position switch arranged to close automatically when said manually operable switch is placed in emergency run position and the other a two position switch controlled by the hand brake of said vehicle and in series with said horn when said brake is in off position.

7. In an automotive vehicle, an engine ignition circuit including a switch, a second parallel circuit including in series one or more of the following switches: an air pressure controlled switch having high and low positions, a switch controlled by the position of the vehicle's emergency door, a switch controlled by the temperature of the engine, and a switch controlled by the engine oil pressure, and a fault-check circuit connected to said engine ignition circuit including an indicator and having switching means for connecting said fault-check circuit to said second circuit at a point where none, one or more than one of said switches has been by-passed whereby an open unby-passed switch in said second circuit may be detected by the behavior of said indicator.

8. In an automotive vehicle, an engine ignition circuit including a switch, automatically operable means for closing and maintaining said switch closed whereby ignition current may be made available to said engine, said means being in a circuit connected to two other circuits, one of said other circuits having in series a plurality of switches each influenced by a condition material in the operation of said vehicle and which switches when closed will operate said means to close said ignition circuit switch, the other of said two other circuits including a manually operable two-position switch with one position leading to the ground and which when in grounded position will be in parallel with the circuit that includes said plurality of switches, and will also operate said means to close said ignition circuit switch.

EARLE R. ROSWELL.

REFERENCES CITED

The following references are of record in the file of this patent:

UNITED STATES PATENTS

| Number | Name | Date |
|---|---|---|
| 1,920,694 | Hancock | Aug. 1, 1933 |
| 1,968,828 | Hardison | Aug. 7, 1934 |
| 2,034,233 | Hasselbaum | Mar. 17, 1936 |
| 2,360,227 | Hemphill | Oct. 10, 1944 |